US005781877A

United States Patent [19]

Rachel et al.

[11] Patent Number: 5,781,877

[45] Date of Patent: Jul. 14, 1998

[54] METHOD FOR DETECTING THE USAGE OF A HEATER IN A BLOCK OF AN INTERNAL COMBUSTION ENGINE

[75] Inventors: Todd Leonard Rachel, Canton; Patrick Edward Smithberger, Plymouth; Scott Richard Hughes, Birmingham; Michael John Cullen; Robert Matthew Marzonie, both of Northville, all of Mich.

[73] Assignee: Ford Global Technologies, Inc., Dearborn, Mich.

[21] Appl. No.: 784,795

[22] Filed: Jan. 16, 1997

[51] Int. Cl.$^6$ .................................................. G01M 15/00

[52] U.S. Cl. ......................... 701/104; 73/118.1; 701/113

[58] Field of Search .................................... 701/102, 103, 701/104, 101, 113; 73/116, 117.2, 117.3, 118.1, 119 A

[56] References Cited

U.S. PATENT DOCUMENTS

| | | | |
|---|---|---|---|
| 3,999,525 | 12/1976 | Stumpp et al. | 123/122 E |
| 5,111,792 | 5/1992 | Nagai et al. | 123/440 |
| 5,213,082 | 5/1993 | Abe et al. | 123/491 |
| 5,507,251 | 4/1996 | Hollis | 123/41.1 |
| 5,544,639 | 8/1996 | Shouda et al. | 123/676 |
| 5,551,384 | 9/1996 | Hollis | 123/142.5 R |
| 5,629,473 | 5/1997 | Hayami | 73/118.1 |

*Primary Examiner*—George M. Dombroske

*Attorney, Agent, or Firm*—Allan J. Lippa, Esq.; Roger L. May, Esq.

[57] ABSTRACT

A method (42) is disclosed for detecting the usage of a heater (31) in a block (30) of an internal combustion engine (11). The method (42) uses temperature measurements of the engine coolant and any ambient air used to create the air/fuel mixture. Based on the difference between the temperatures, the temperatures are weighted and added to create a temperature variable. The temperature variable is used by the electronic engine control module (34) to create an air/fuel mixture which will allow the internal combustion engine (11) to start smoothly. The method (42) operates on this modified temperature; i.e., the temperature variable, which is not the temperature of the engine coolant, nor the ambient air, and allows for the stoichiometric balance of the air/fuel mixture to be modified to optimize performance of the internal combustion engine (11) during a cold start in cold weather with warm engine coolant.

11 Claims, 3 Drawing Sheets

FIG I

METHOD FOR DETECTING THE USAGE OF A HEATER IN A BLOCK OF AN INTERNAL COMBUSTION ENGINE

BACKGROUND OF THE INVENTION

1. Field of the Invention

The invention relates to a method for detecting usage of a heater in a block of an internal combustion engine. More particularly, the invention relates to a method for detecting usage of a heater in a block of an internal combustion engine and to adjust the amount of fuel delivered to the internal combustion engine based thereon.

2. Description of the Related Art

Currently, block heaters are used to heat the block and engine coolant in an internal combustion engine for motor vehicles and the like found in cold climates. The heater for the block is an electrical heater and typically operates on 120 volts as a standard household appliance. The heater warms the engine coolant, the heat from which radiates to other engine components and fluids. Warmer engine fluids have a lower viscosity which causes the engine to rotate easier in the cold weather.

A problem associated with the usage of a heater in a block of an internal combustion engine is the false temperature readings used by the electronic engine control to determine the amount of fuel to be consumed by the internal combustion engine. More specifically, the air/fuel mixture which is calculated in part on the ambient air temperature and the engine coolant temperature, is designed to maximize fuel efficiency. Because less fuel is required in warmer temperatures, an internal combustion engine may have difficulty starting and idling when the temperature measured by the electronic engine control module is not the temperature of the air which is mixed with the fuel.

Although the use of a heater in a block of an internal combustion engine may lower the viscosity of the fluids therein, it provides a temperature reading to the electronic engine control which is not accurate in terms of air temperature and may result in unnecessary enleanment. Therefore, there is a need to determine when a heater in the block of an internal combustion engine is used and to compensate therefor to prevent unnecessary enleanment of the fuel sent to the internal combustion engine to be combusted.

SUMMARY OF THE INVENTION

Accordingly, a method for detecting the use of a heater in a block of an internal combustion engine is disclosed. The method includes the step of measuring the temperature of the engine coolant. The temperature of ambient air is also measured. The method includes the step of determining usage of the heater in the block. The method also includes the step of adjusting the amount of fuel delivered to the internal combustion engine when a determination of the usage of the heater is made.

One advantage associated with the invention is the ability to detect the use of a heater in the block of an internal combustion engine. Another advantage associated with the invention is the ability to adjust the amount of fuel delivered to the internal combustion engine when detection of usage of the heater in the block of the internal combustion engine is made. Still another advantage associated with the invention is the ability to detect the use of the heater in the block of an internal combustion engine without the addition of any additional sensors and/or parts.

BRIEF DESCRIPTION OF THE DRAWINGS

The above advantages of the invention will be more clearly understood by reading an example of an embodiment in which the invention is used to advantage with reference to the attached drawings wherein.

DESCRIPTION OF AN EMBODIMENT

Figure 1:
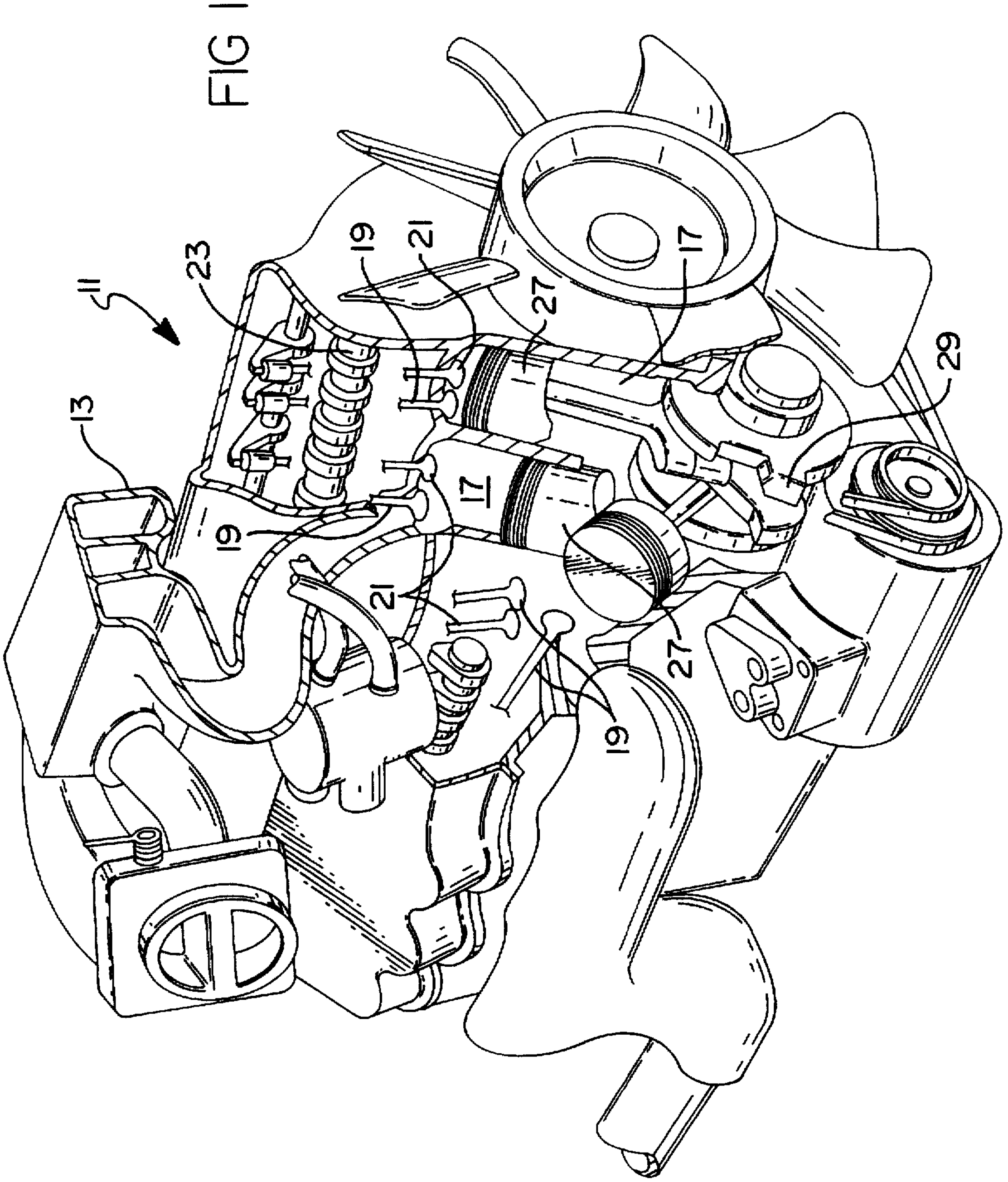
FIG. 1 is a perspective view, partially cut away, of an internal combustion engine.

Referring to FIG. 1, an internal combustion engine is generally indicated at 11. Although internal combustion engine 11 is depicted and discussed as being a part of a motor vehicle 12 (FIG. 2), it should be appreciated by those skilled in the art that internal combustion engine 11 may be used in any environment requiring power generated thereby. Internal combustion engine 11 receives air through air inlet port 13. A fuel injector (not shown) injects fuel for a plurality of cylinders. An air/fuel mixture is drawn into each cylinder 17 through a plurality of inlet valves 19. The valves, inlet 19 and outlet 21, are moved between an open position and a closed position during different portions of a fourstroke cycle. The opening and closing thereof is timed by camshaft 23 which is rotated through a timing mechanism. When the air/fuel mixture is ignited by a spark plug (not shown), one associated with each cylinder 17, piston 27 within each of the cylinders 17 is forced to move downwardly. This downward action rotates crankshaft 29 which, in turn, transfers the power generated by the combustion of the air/fuel mixture into a mechanical rotating force to be controlled and used.

Figure 2:
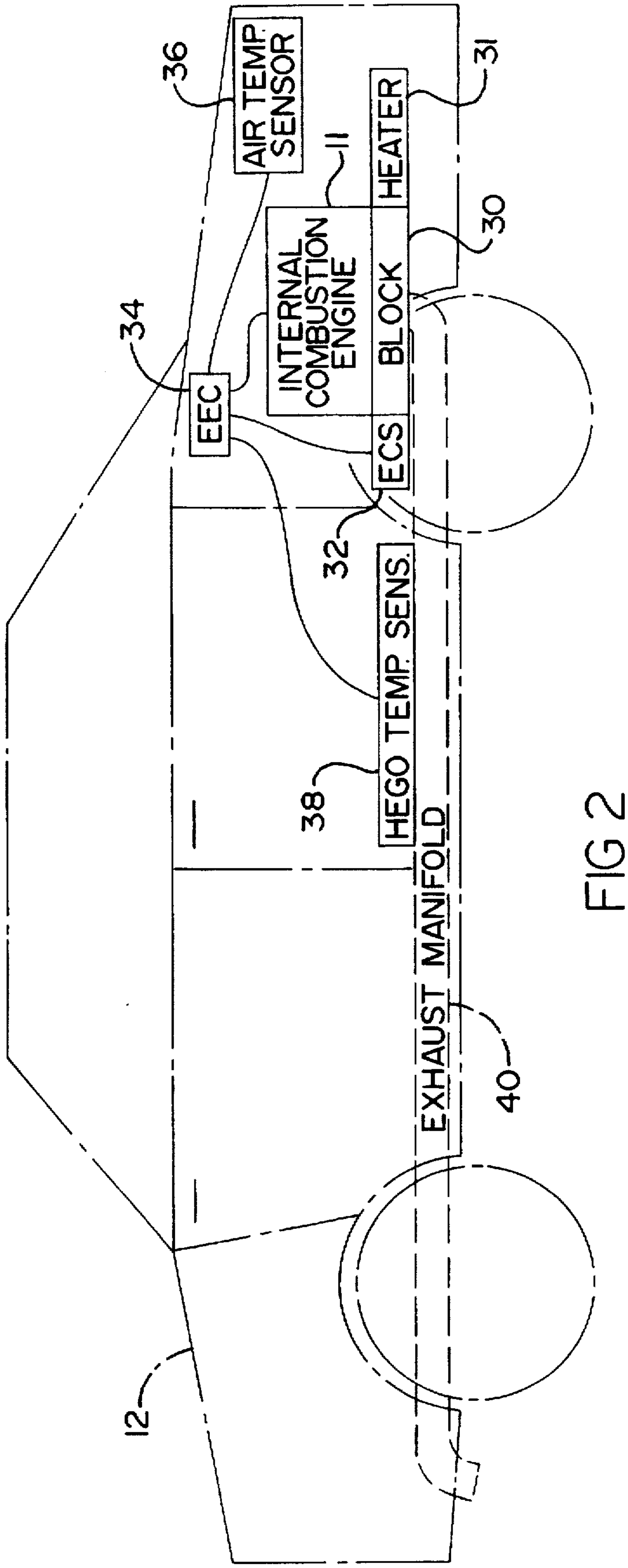
FIG. 2 is a block diagram of a motor vehicle, its internal combustion engine, and the sensors and control module associated therewith.

Referring to FIG. 2, internal combustion engine 11 of motor vehicle 12 is connected thereto in part by block 30. Block 30 includes at least one channel (not shown) which extends through block 30 and allows engine coolant to pass therethrough. The engine coolant cools block 30 and internal combustion engine 11 which is heated by the combustion of the air/fuel mixture in internal combustion engine 11. An engine coolant sensor 32 senses the temperature of the engine coolant as it passes through block 30. The sensed temperature is sent to electronic engine control module 34. Air temperature sensor 36 senses the temperature of ambient air received by internal combustion engine 11. The temperature sensed by air temperature sensor 36 is transmitted to the engine control module 34 through a conductor 37. The value of the sensed temperature is used in a calculation to determine the proper mixture of fuel and air, the temperature of which has been sensed, to create the air/fuel mixture to be combusted in each of the plurality of cylinders 17 of internal combustion engine 11. Heated engine gas oxygen (HEGO) temperature sensor senses the temperature of the HEGO sensor (not shown) which only indicates when there is free $0_2$. More specifically, the HEGO sensor measures the amount of oxygen in the exhaust fumes which are passing through exhaust manifold 40 of motor vehicle 12. The temperature sensed by HEGO temperature sensor 38 is sent to electronic control module 34 for processing thereby.

Figure 3:
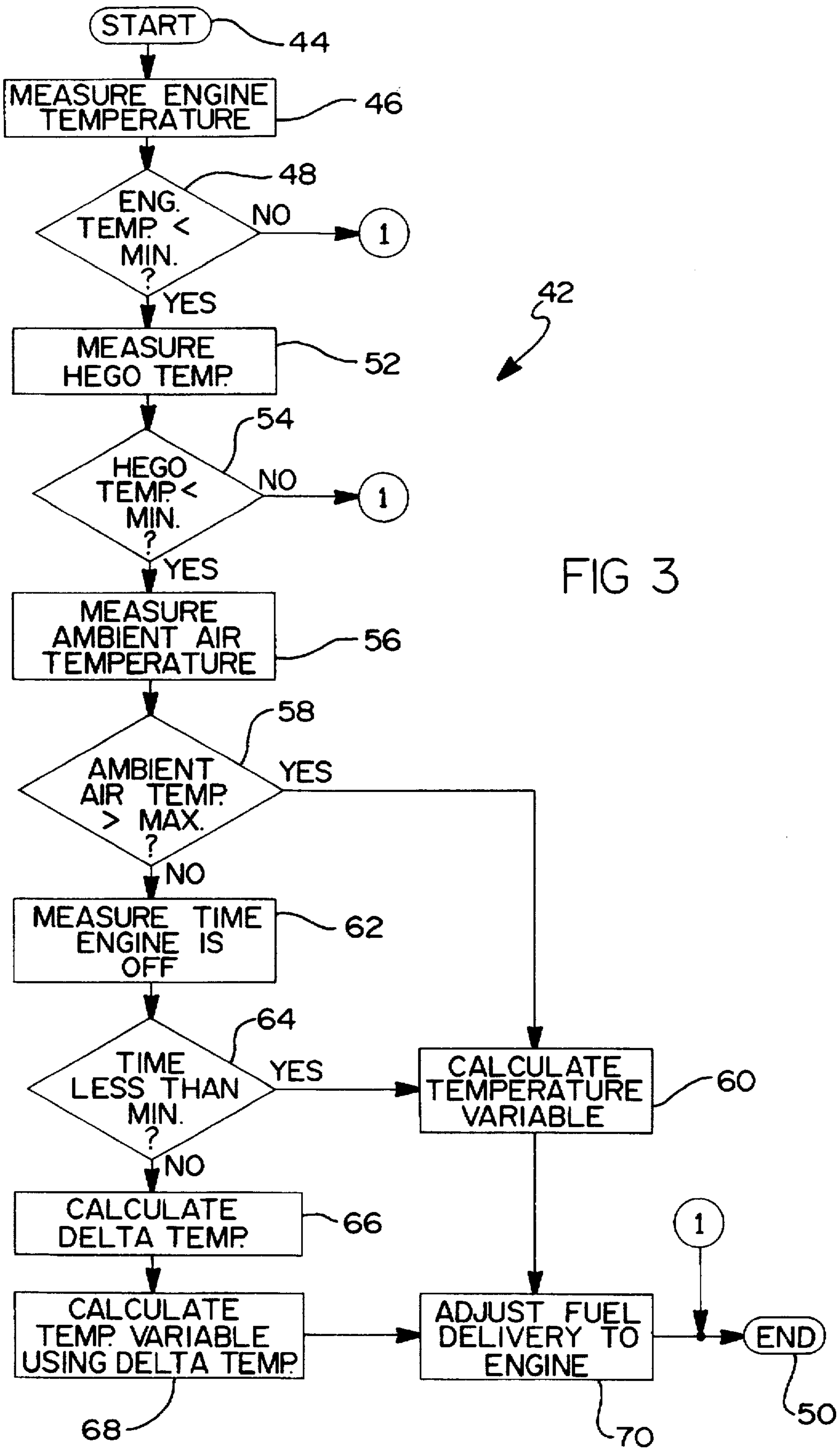
FIG. 3 is a flow chart of one embodiment of the method according to the invention.

Referring to FIG. 3, the method for detecting the use of heater 31 in block 30 of internal combustion engine 11 is generally indicated at 42. The method is started at 44. The engine temperature is measured at 46. In one embodiment, the measurement of the engine temperature is taken by measuring the engine coolant temperature. It is then determined whether the engine temperature is less than a minimum value at 48. If not, the method is terminated at 50 because internal combustion engine 11 is warmed up and does not require the same mixture as is required by internal combustion engine 11 when it is cold and being started, i.e., during a cold start. More specifically, the amounts of the components, namely air and fuel, combined to create the mixture, namely, the air/fuel mixture, differ in a cold start situation from a situation when internal combustion engine 11 has warmed. If the engine temperature is below a minimum value, the HEGO temperature sensor 38 measures the temperature of the HEGO sensor (not shown) at 52. It is then determined whether HEGO temperature is less than a minimum value at 54. If the HEGO temperature is greater than the minimum value, the method is terminated at 50. The measurements of the engine temperature and the HEGO temperature determines whether internal combustion engine 11 is warmed up. If internal combustion engine 11 is warmed up, feedback from HEGO sensor is used in calculations to determine the quantities of the components required to optimize the combustion of the air/fuel mixture. To those skilled in the art, this mixture composition may be referred to as "stoichiometric mixture." Open fuel calculations are calculations made by electronic engine control module 34, or a similarly programmed microprocessor, when HEGO sensor has not been warmed by exhaust fumes passing through exhaust manifold 40 to a temperature which allows HEGO sensor to accurately measure the amount of oxygen in the exhaust fumes. The inability of the HEGO sensor to measure the oxygen requires the electronic engine control module 34 to calculate the amounts of air and fuel needed to combust the air/fuel mixture most efficiently. These calculations are done without the feedback of HEGO sensor and, thus, are referred to as "open loop calculations." If, however, the engine temperature and the HEGO temperature are below the minimum values, electronic engine control module 34 may be required to calculate the combustion of the air/fuel mixture using open loop calculations. If so, the method is continued.

The method includes the step of measuring ambient air temperature at 56. It is then determined whether the ambient temperature exceeds a maximum value at 58. If so, a temperature variable is calculated at 60. The temperature value is the addition of the ambient air temperature, multiplied by an air temperature factor, and the engine coolant temperature, multiplied by an engine temperature factor. The air temperature factor and the engine temperature factor are variables used to weight the measured temperatures of ambient air and engine coolant, respectively. They depend on the difference between the temperatures of the ambient air and the engine coolant. They extend in the range between zero and one. The resulting temperature variable becomes weighted based on an average of the air coolant temperature and the engine coolant temperature. In one embodiment, the weighting is a zero factor for the ambient air and unity for the engine coolant temperature when the ambient air temperature exceeds the maximum value.

If the ambient air does not exceed the maximum value, the amount of time internal combustion engine 11 is off is measured at 62. It is then determined whether the time measured is less than a minimum value at 64. If the time measured is less than the minimum value, indicating that internal combustion engine 11 has been turned off for a very short period of time, the temperature variable is calculated at 60 using the weighting of the air temperature factor and the engine temperature factor similar to that as though the ambient air temperature exceeded the maximum value at 58. Because internal combustion engine 11 has been operating, it is not necessary to further weight the factors.

If it is determined that the time is greater than the minimum value, a change in temperature value, ΔT, is calculated at 66. The change in temperature value is used at 68 to determine the temperature variable. The change in temperature variable is calculated as the difference between the engine coolant temperature and an inferred engine temperature. The inferred engine temperature is the temperature of internal combustion engine 11 without the use of heater 31. The temperature variable is calculated as a function of the change in temperature variable which is multiplied with both the ambient air temperature and the engine coolant temperature as set forth below:

$$\text{Temp. var.}=f(\Delta T)^*(\text{amb. air temp.})+(1-f(\Delta T))^*(\text{eng. temp.})$$

In one embodiment, the function f utilizes a chart to determine its value based on the change in temperature variable ΔT as set forth below:

| ΔT | $f$ |
|---|---|
| <8 | 0 |
| <20 | 0.5 |
| <80 | 0.5 |
| <120 | 0 |

Once the temperature variable is calculated, either at block 60 or block 68, the air/fuel mixture is adjusted at 70 by electronic engine control module 34 using the temperature variable as the temperature of ambient air. More specifically, temperature variable, calculated in the above equation, is a "modified" temperature taking into account the difference between engine coolant temperature and ambient air temperature. This "modified" temperature is used by electronic engine control module 34 as a substitute value in calculations of proper component levels of air/fuel mixture when open loop fuel calculations are required. It should be appreciated by those skilled in the art that calculations of air/fuel mixture composition as a function of temperature are known to those skilled in the art and are not a part of the present invention. The use of the temperature variable as a "substitute" or "modified" temperature allows internal combustion engine 11 to operate similar to that of internal combustion engine 11 which has not been heated by heater 31 in block 30 thereof. More specifically, method 42 allows heater 31 to heat block 30 and the engine coolant therein allowing the viscosity of the engine coolant to decrease without affecting calculations to the air/fuel mixture in such a way as to create an unnecessary enleanment resulting in a possible difficulty in starting and idling internal combustion engine 11.

This concludes a description of an example of operation in which the invention claimed herein is used to advantage. Those skilled in the art will bring to mind many modifications and alterations to the example presented herein without departing from the spirit and scope of the invention. Accordingly, it is intended that the invention be limited only by the following claims.

What is claimed is:

1. A method for detecting the use of a heater (31) in a block (30) of an internal combustion engine (11), the method including the steps of:

measuring temperature of engine coolant;

measuring temperature of ambient air;

determining whether the heater (31) in the block (30) has been used based on the measured temperature of the engine coolant and the ambient air; and adjusting an amount of fuel delivered to the internal combustion engine (11) when a determination is made that the heater (31) in the block (30) has been used.

2. A method as set forth in claim 1 wherein the step of determining includes the step of comparing the temperature of engine coolant with an inferred engine temperature to identify a change in temperature variable.

3. A method as set forth in claim 2 wherein the step of adjusting includes the step of calculating a temperature variable.

4. A method for detecting the use of a heater (31) in a block (30), of an internal combustion engine (11) the method including the steps of:

measuring temperature of engine coolant;

measuring temperature of ambient air;

determining usage of the heater (31) in the block (30);

adjusting an amount of fuel delivered to the internal combustion engine (11) when a determination of usage of the heater (31) is made; wherein the step of determining includes the step of comparing the temperature of engine coolant with an inferred engine temperature to identify a change in temperature variable;

wherein the step of adjusting includes the step of calculating a temperature variable; and wherein the step of calculating a temperature variable includes the change in temperature variable.

5. A method for detecting the use of a heater (31) in a block (30) of an internal combustion engine (11), the method including the steps of:

measuring temperature of engine coolant;

measuring temperature of ambient air;

determining usage of the heater (31) in the block (30);

adjusting an amount of fuel delivered to the internal combustion engine (11) when a determination of usage of the heater (31) is made;

wherein the step of determining includes the step of comparing the temperature of engine coolant with an inferred engine temperature to identify a change in temperature variable;

wherein the step of adjusting includes the step of calculating a temperature variable; and multiplying the temperature of ambient air by an air temperature factor.

6. A method as set forth in claim 5 including the step of multiplying the temperature of engine coolant by an engine temperature factor.

7. A method as set forth in claim 6 including the step of terminating the method when the temperature of engine coolant exceeds a predetermined value.

8. A method as set forth in claim 6 including the step of measuring temperature of an exhaust gas sensor.

9. A method as set forth in claim 8 including the step of terminating the method when the temperature of the exhaust gas sensor exceeds a second predetermined value.

10. A method for detecting the use of a heater (31) in a block (30) of an internal combustion engine (11), the method including the steps of:

measuring temperature of engine coolant;

measuring temperature of ambient air;

comparing the temperature of engine coolant with an inferred engine temperature to identify a change in temperature variable;

determining usage of the heater (31) in the block (30);

multiplying the temperature of ambient air by a function of the change in temperature variable to create a weighted ambient air temperature;

calculating a temperature variable based on the weighted ambient air temperature; and adjusting amount of fuel delivered to the internal combustion engine (11) based on the temperature variable when a determination of usage of the heater (31) is made.

11. A method for detecting the use of a heater (31) in a block (30) of an internal combustion engine (11), the method including the steps of:

measuring temperature of engine coolant;

measuring temperature of ambient air;

determining whether the heater (31) in the block (30) has been used based on the measured temperature of the engine coolant and the ambient air;

calculating a temperature variable; and adjusting an amount of fuel delivered to the internal combustion engine (11) based on the temperature variable when a determination is made that the heater (31) in the block (30) has been used.

* * * * *